No. 687,774. Patented Dec. 3, 1901.
E. R. OLIVER.
NUT LOCK.
(Application filed Mar. 5, 1901.)
(No Model.)

Witnesses:
R. G. Orwig.
F. C. Stuart

Inventor E. R. Oliver
by Orwig & Lane Attys.

United States Patent Office.

EDWIN R. OLIVER, OF DES MOINES, IOWA.

NUT-LOCK.

SPECIFICATION forming part of Letters Patent No. 687,774, dated December 3, 1901.

Application filed March 5, 1901. Serial No. 49,721. (No model.)

*To all whom it may concern:*

Be it known that I, EDWIN R. OLIVER, a citizen of the United States, residing at Des Moines, in the county of Polk, State of Iowa, have invented certain new and useful Improvements in Nut-Locks, of which the following is a specification.

The objects of my invention are, first, to provide a device of this class of simple, durable, and inexpensive construction.

A further object is to provide a device of this class in which the nut is applied to the bolt as required to clamp articles together and is screwed upon the bolt in the ordinary way, and after the nut is seated firmly in position the nut-lock will prevent further rotation of the nut in either direction.

A further object is to provide a nut-lock of this class which will permit the nut to be moved, by means of a wrench, in either direction upon the bolt and to automatically hold the nut in any position in which it may be stopped.

A further object is to provide a device of this class which when placed in position as required for use will be firmly and securely held in such manner that none of the parts of the device are liable to be broken or misplaced.

My invention consists in certain details in the construction, arrangements, and combination of the various parts of a device whereby the objects contemplated are attained, as hereinafter more fully set forth, pointed out in my claim, and illustrated in the accompanying drawings, in which—

Figure 1:
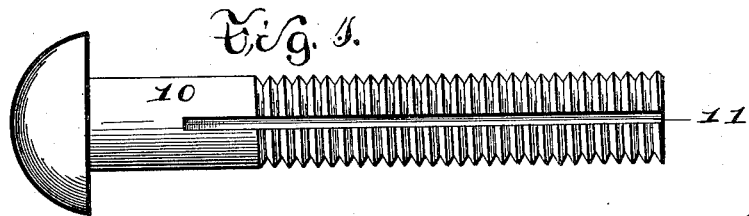
Figure 2:
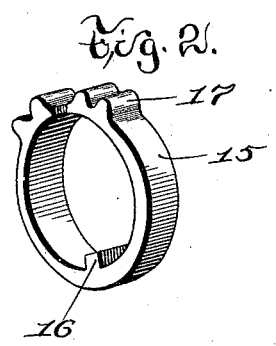
Figure 3:
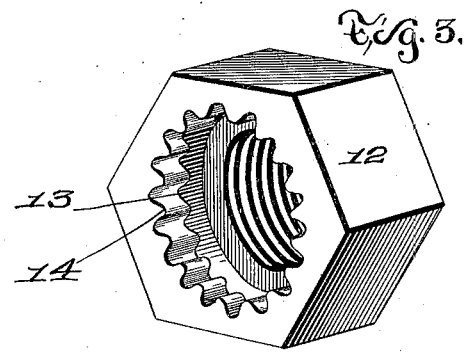
Figure 4:
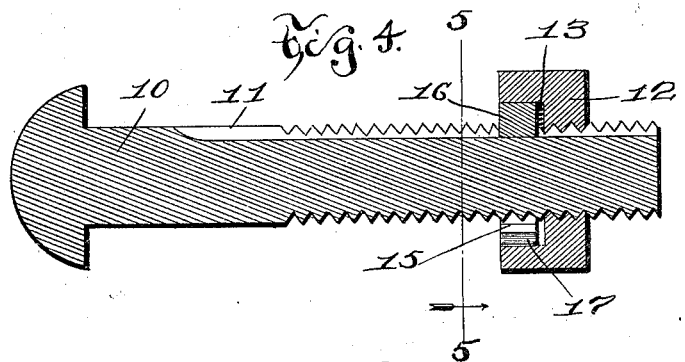
Figure 5:
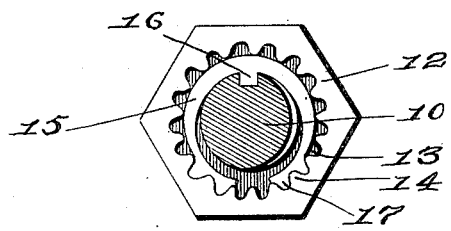

Figure 1 shows a bolt designed for use in connection with my improved nut-lock. Fig. 2 shows in perspective a ring designed to co-act with the nut and bolt in locking the nut to the bolt. Fig. 3 shows in perspective a nut designed for use in my improved nut-lock. Fig. 4 shows a longitudinal sectional view of the complete device, and Fig. 5 shows a transverse section of same on line 5 5 of Fig. 4.

Referring to the accompanying drawings, I have used the numeral 10 to indicate a bolt of ordinary construction having a longitudinal groove 11.

The reference-numeral 12 is used to indicate a nut designed to be screwed to a bolt of the ordinary construction throughout, except that on one face of the nut surrounding the screw-threaded opening I have formed an annular chamber 13 of somewhat larger diameter than the diameter of the opening in the nut, and on the periphery of this chamber I have formed a series of teeth 14.

The means for screwing the nut to the bolt comprises a flat ring 15, made of spring metal of greater thickness at one side than at a point diametrically opposite therefrom. At about the central portion of the thickened part of the ring I have formed on the inner periphery a lug 16 to project inwardly. At a point diametrically opposite from the lug 16 the ring is divided, and on each end portion of the ring thus formed are one or more outwardly-projecting teeth 17, designed to engage the teeth 14. The inner periphery of the ring is smooth except for the projection 16, so that it may slide freely upon the bolt 10 of the chamber 13, and the chamber is of such size as to freely admit the ring 15, and a resiliency of the ring 15 serves to hold the teeth 17 into engagement with the teeth 14. However, the relative proportions of the parts are such that when a sufficient power is applied to the nut it will cause the inclined face of the teeth 14 to bear against the teeth 17 in such manner as to force the ends of the ring 15 toward the bolt and toward each other far enough to permit a rotation of the nut.

In practical use the ring is placed within the chamber 13 of the nut and then the nut and ring are placed on the bolt with the lug 16 of the ring in the groove 11 of the bolt. Obviously as the nut is turned the ring remains stationary, except in regard to its movement in the longitudinal direction of the bolt. The width of the ring is less than the depth of the chamber 13, so that the inner face of the nut may engage one of a number of articles to be clamped together without said ring engaging said article, and when the nut has been turned as far as possible the teeth on the ring in engagement with the teeth on the nut will prevent a rotation of the nut, except when power enough is applied to the nut to bend the ends of the ring inwardly and permit the teeth to slide relatively to each other.

Having thus described my invention, what I claim, and desire to secure by Letters Patent of the United States therefor, is—

An improved nut-lock, comprising in combination a bolt having a horizontal groove, a nut having an internally-screw-threaded opening to admit the bolt and also having an annular chamber on its inner face surrounding the bolt-opening, and having ratchet-teeth on the interior of the said annular chamber, and a split spring-ring having a key to enter the groove of the bolt and having one or more teeth on its ends to yieldingly engage the teeth on the nut, the end portions of the ring being of such size and shape that when in position for locking the ends may be forced inwardly out of engagement with the nut, and the said teeth being of such shape that the ends of the ring will spring inwardly when the nut is turned, for the purposes stated.

EDWIN R. OLIVER.

Witnesses:
REUBEN G. ORWIG,
W. R. LANE.